United States Patent
Hadi et al.

(10) Patent No.: US 10,956,678 B2
(45) Date of Patent: Mar. 23, 2021

(54) SENTIMENT ANALYSIS

(71) Applicant: S&P Global Inc., New York, NY (US)

(72) Inventors: Mohammed Hadi, New York, NY (US); Michal Koblas, New York, NY (US); Saeed Shoaraee, Toronto (CA)

(73) Assignee: S&P Global Inc., New York, NY (US)

( * ) Notice: Subject to any disclaimer, the term of this patent is extended or adjusted under 35 U.S.C. 154(b) by 316 days.

(21) Appl. No.: 16/111,963

(22) Filed: Aug. 24, 2018

(65) Prior Publication Data
US 2020/0065383 A1 Feb. 27, 2020

(51) Int. Cl.
*G06F 40/30* (2020.01)
*G06K 9/00* (2006.01)
*G06F 40/205* (2020.01)
*G06F 40/284* (2020.01)
*G06N 3/08* (2006.01)
*G06N 3/04* (2006.01)

(52) U.S. Cl.
CPC ............ *G06F 40/30* (2020.01); *G06F 40/205* (2020.01); *G06F 40/284* (2020.01); *G06K 9/00442* (2013.01); *G06N 3/0445* (2013.01); *G06N 3/08* (2013.01); *G06K 2209/01* (2013.01)

(58) Field of Classification Search
CPC ...... G06F 40/30; G06F 40/205; G06F 40/284; G06N 3/08; G06N 3/0445; G06K 9/00442; G06K 2209/01; G06K 9/6256; G06K 9/6273
USPC .......................................................... 704/9
See application file for complete search history.

(56) References Cited

U.S. PATENT DOCUMENTS

2019/0042933 A1* 2/2019 Powell .................. G06N 20/00

OTHER PUBLICATIONS

"A Word2Vec Keras tutorial—Adventures in Machine Learning", http://adventuresinmachinelearning.com/word2vec-keras-tutorial/, Aug. 30, 2017, 20 pages.
Denny Britz, "Understanding Convolution Neural Networks for NLP", WildML, http://www.wildml.com/2015/11/understanding-convolution-neural-networks-for-nlp/, Nov. 7, 2015, 16 pages.
Jason Brownlee, "How to Use Word Embedding Layers for Deep Learning with Keras", Natural Language Processing, Oct. 4, 2017, https://machinelearningmastery.com/use-wor-embedding-layers-deep-learning-keras/, 58 pages.
Colah's Blog, http://colah.github.io/, downloaded Aug. 23, 2018, 27 pages.

(Continued)

*Primary Examiner* — Thierry L Pham
(74) *Attorney, Agent, or Firm* — Fish & Richardson P.C.

(57) ABSTRACT

This specification describes methods and systems for sentiment analysis. One of the methods includes: receiving a plurality of documents, each document having text data and for each of the documents: (1) representing at least part of the document's text data in a multi-dimensional vector space to produce vectorized text data; (2) applying a neural network to the vectorized text data to calculate a sentiment score, wherein the neural network has been trained using a two step process including (a) training the neural network with a non-domain specific training set; and (b) training the neural network with a domain specific training set; and (3) determining a sentiment score for an entity based at least in part on the sentiment scores for the plurality of documents.

20 Claims, 6 Drawing Sheets

(56) References Cited

OTHER PUBLICATIONS

Konukoii, "Twitter Sentiment Analysis Using Combined LSTM-CNN Models", Feb. 19, 2018, Compsci, http://konukoii.com/blog/2018/02/19/twitter-sentiment-analysis-using-combined-lstm-cnn-models/, 11 pages.
Le et al., Distributed Representations of Sentences and Documents, Proceedings of the 31st International Conference on Machine Learning, 2014, JMLR: W&CP vol. 32, arXiv:1405.4053v2 [cs.CL] May 22, 2014, 9 pages.
Li et al., "Sentiment Analysis on the People's Daily", Proceedings of the 2014 Conference on Empirical Methods in Natural language Processing (EMNLP), pp. 467-476, Oct. 25-29, 2014, 10 pages.
Lopez et al., "Deep Learning applied to NLP", arXiv:1703.03091v1 [cs.CL] Mar. 9, 2017, 15 pages.
Szmkowiak, Theo, "How to implement Senitment Analysis using word embedding and Convolutional Neural Networks on Keras", https://medium.com/@thoszymkowiak/how-to-implement-sentiment-analysis-using-word-embedding-and-convolutional-neural-networks-on-keras-163197aef623, Feb. 17, 2017, 3 pages.
Wang et al., "ANTUSD: A Large Chinese Sentiment Dictionary", LREC (2016),pp. 2697-2702.
Yogatama et al., "Making the Most of Bag of Words: Sentence Regularization with Alternating Direction Method of Multipliers", Proceedings of the 31st International Conference on Machine learning, 2014, JMLR: W&CP vol. 21, 9 pages.
Zhang et al., "A Sensitivity Analysis of (and Practitioners' Guide to) Convolutional Neural networks for Sentence Classification", arXiv:1510.03820V4 [cs.CL] Apr. 6, 2016, 18 pages.
Zhang et al., "Sentiment Classification with Convolutional Neural networks: an Experimental Study on a Large-scale Chinese Conversation Corpus", 2016 12th International Conference on Computational Intelligence and Security (CIS), IEEE, Dec. 2016, 5 pages.

* cited by examiner

SENTIMENT ANALYSIS

BACKGROUND

Technical Field

This specification relates to sentiment analysis.

Background

Sentiment analysis refers to the use of natural language processing, text analysis, and computational linguistics, to systematically identify, extract, quantify, and/or study a user's thoughts or reactions, often with regard to a specific entity or event. Sentiment analysis is widely applied to voice of the customer materials such as reviews and survey responses, online and social media and healthcare materials for applications that range from marketing to customer service to clinical medicine.

Generally speaking, sentiment analysis aims to determine the attitude of a speaker, writer, or other subject with respect to some topic or the overall contextual polarity or emotional reaction to an entity, document, interaction, or event. The attitude may be a judgment or evaluation.

SUMMARY

This specification describes technologies for performing sentiment analysis. These technologies generally involve sentiment analysis In general, one innovative aspect of the subject matter described in this specification can be embodied in methods that include the actions of receiving a plurality of documents, each document having text data and for each of the documents: (1) representing at least part of the document's text data in a multi-dimensional vector space to produce vectorized text data; (2) applying a neural network to the vectorized text data to calculate a sentiment score, wherein the neural network has been trained using a two step process including (a) training the neural network with a non-domain specific training set; and (b) training the neural network with a domain specific training set; and (3) determining a sentiment score for an entity based at least in part on the sentiment scores for the plurality of documents.

The size of the domain specific training set can depend on the context. In one example, Wikipedia can be used for the non-domain specific training set. A model can start front a totally random state and then optimize to a domain specific training set. For certain embodiments, instead of starting from a random state, the system starts with something better by first using a non-domain specific training set (e.g., wikipedia) and then uses a domain specific training set. By training the sentiment analysis system in this way, a smaller domain specific training set can be used relative to what would be required if starting from a completely random state. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method can further include ranking the plurality of documents based at least in part on each document's sentiment score. The method can further include tokenizing the text data. The method can further include highlighting via a display to a user at least one area in a document that reflects sentiment above a specified threshold. The plurality of documents can relate to a specified company and the method can further include aggregating the sentiment of the plurality of documents to determine a sentiment score for the specified company. The multi-dimensional vector space can have between 100 and 500 dimensions. Representing at least part of the text data in a multi-dimensional vector space to produce vectorized text data can include vectorizing words that appear more often than a specified threshold.

The method can further include: (a) receiving text data for a plurality of articles and for each of the articles (1) parsing natural language into text data; (2) representing at least part of the text data in a multi-dimensional vector space to produce vectorized text data; and (3) applying a neural network to the vectorized text data to calculate a sentiment score, wherein the neural network has been trained using a process comprising: (i) training the neural network with a non-domain specific training set; and (ii) training the neural network with a domain specific training set; and (b) identifying at least one risk for a specified company based at least in part the sentiment scores for the plurality of articles. The risk can be selected from a group of risks including vendor risk and supplier risk. The documents can include natural language text and receiving a plurality of documents can include parsing natural language into parsed text data and representing at least part of the document's parsed text data in a multi-dimensional vector space to produce vectorized text data.

In general, another innovative aspect of the subject matter described in this specification can be embodied in methods that include the actions of: (a) receiving a plurality of documents and for each of the documents (1) parsing natural language into text data, (2) representing at least part of the text data in a multi-dimensional vector space to produce vectorized text data, and (3) applying a neural network to the vectorized text data to calculate a sentiment score; and (b) indicating via a display to a user at least one area in a document that reflects sentiment above a specified threshold. The method can further include displaying to a user a graph of at least some of the plurality of documents showing each article's date of publication and sentiment score.

The subject matter described in this specification can be implemented in particular embodiments so as to realize one or more of the following advantages. Decision makers at a company considering a potential partner (e.g., vendor, supplier or customer) typically consider limited standard reports on the potential partner or resort to ad hoc manual review of publicly available documents describing the potential partner. For large companies in a developed market there is a lot of information that is reasonably timely. In developing markets the data might not be available or is of dubious quality. Finally for small and mid size companies, standard reports, e.g., 10Ks or 10Qs, don't typically have to be reported so there is less information available to gauge the risk of partnering with a potential partner.

For example in China there are a large number of SMEs who don't have to report financials to the central registry (SAIC). This creates a challenge for anyone doing business with Chinese counterparts. Sentiment analysis can be used as an early warning signal. Using the sentiment analysis systems and methods described in this specification, one can 1) quickly analyze unstructured but domain specific documents at scale; and 2) quickly and efficiently access relevant documents and even relevant parts of the relevant documents. In certain embodiments, business context is maintained throughout the pipeline; the system incorporates documents within a specified context or use case e.g., determining whether a potential partner will remain solvent, and maintains a feedback loop throughout the use case.

The importance of the sentiment analysis approaches (e.g., the vectorization approaches) described in this specification is illustrated by the following examples.

Example 1

In a financial context the word "positive" results in analogous terms after vectorization that have a positive connotation (e.g., strong, earnings). However, in a medical context the word "positive" results in analogous terms after vectorization that have a negative connotation (e.g., sick, disease).

Example 2

In a financial/credit risk context the word "outstanding" results in analogous terms after vectorization that have a negative connotation (e.g., debt, default, risk). In a consumer context word "outstanding" results in analogous terms that after vectorization have a positive connotation (e.g., high, strong, confidence).

Example 3

In a financial context the word "conservative" results in analogous terms after vectorization that have a positive connotation (e.g., risk averse, oversight, compliant). In a consumer business context the word "conservative" results in analogous terms that after vectorization have a negative connotation (e.g., less spending, lower growth, insufficient demand).

The importance of maintaining context for the sentiment analysis pipeline (e.g., online training, classification and attribution) includes the following: As an informed users receives targeted notifications he can provide his feedback and the feedback gets incorporated again within the training set automatically. This automatic incorporation of informed user feedback means the system becomes more effective by incorporating automatically the feedback from a context sensitive audience. Thus notifications become iteratively more targeted and the user's actions become much more meaningful within their business. Stated differently, the sentiment analysis system provides results (e.g., on a document by document basis) via targeted notifications to end users and obtains feedback from the context sensitive end users. The system can automatically incorporate feedback via a training set, allowing for even more targeted insights.

Furthermore, embodiments of the sentiment analysis system can be modular allowing the system to be easily extended to other business contexts and other languages.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
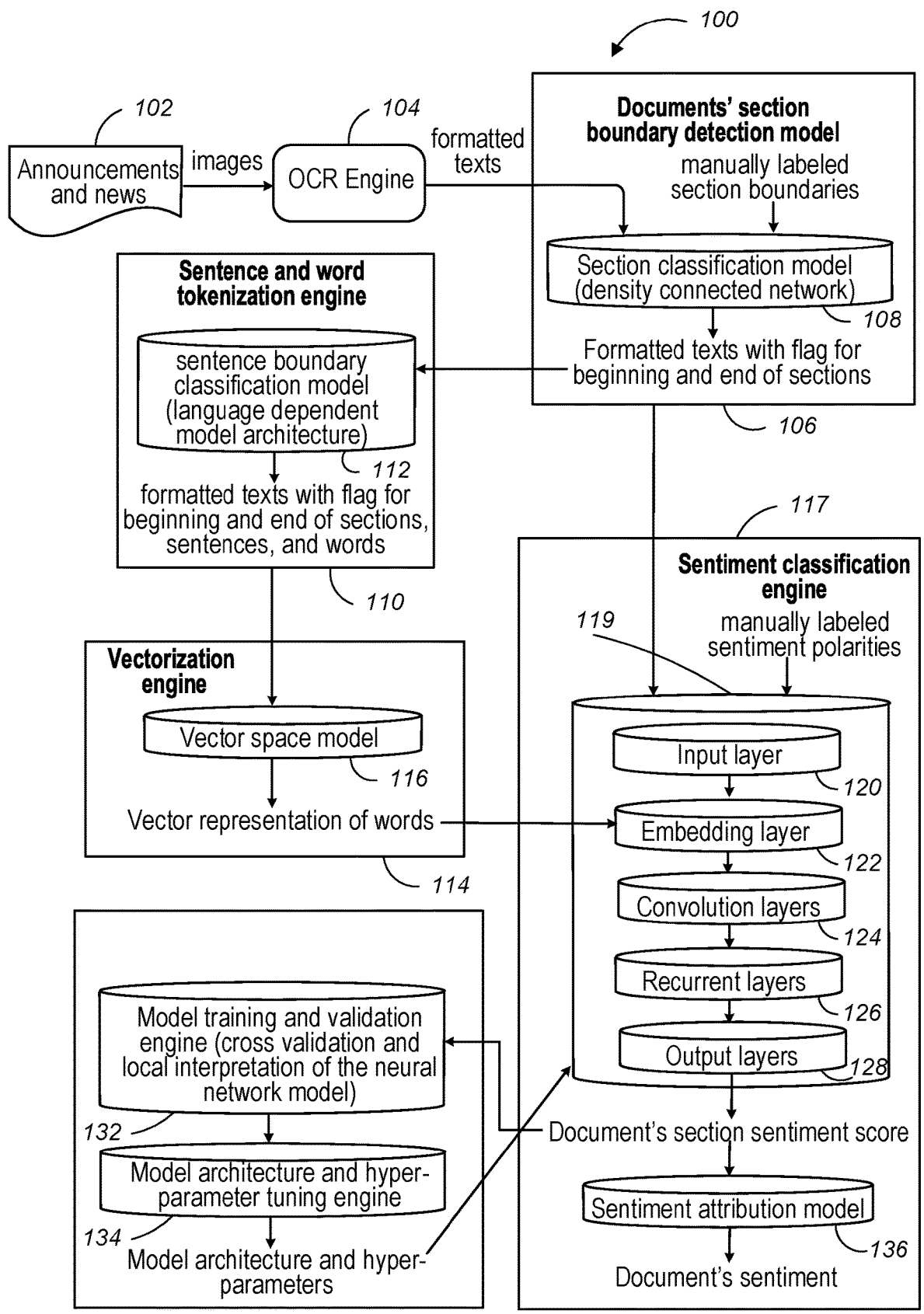
FIG. 1 is a schematic illustrating the components of one example of a sentiment analysis system.

Sentiment analysis can be used as an early warning signal. FIG. 1 shows an example sentiment analysis system 100. The system receives documents 102 (e.g., announcements and news) via an optical character recognition (OCR) engine 104 as images. The OCR engine outputs formatted text to a document section boundary detection engine 106 that includes a document section boundary detection model.

The engine 106 uses a section classification model 108 that can be trained using manually labeled section boundaries. The section classification model 108 can output formatted text with flags for the start and end of sections.

The formatted text is then fed to a both a sentence and word tokenization engine 110 and to a sentiment classification engine 117. The sentence and word tokenization engine 110 includes a sentence boundary classification model 112 that uses a language dependent model architecture to output formatted text with flags for the start and end of sections sentences and words.

The formatted text is then fed to a vectorization engine 114 that includes a vector space model 116. The model 214 outputs a vector representation of words. The vector representation of words is then fed to an embedding layer 122 of a sentiment classification model 119 in the sentiment classification engine 117.

In addition to formatted text with flags for the start and end of sections and a vector representation of words, the sentiment classification engine 117 also receives as input manually labeled sentiment polarities. The engine 117 uses the manually labeled sentiment polarities to train the model 119. In certain embodiments, the model 119 includes an input layer 120 that provides inputs to an embedding layer 122 that provides inputs to convolution layers 124 that provides inputs to recurrent layers 126 that provides inputs to output layers 128. The model outputs a sentiment score for a document's section. A sentiment attribution model 136 receives the sentiment scores for various document sections and produces a sentiment score for a document.

In addition, a model training and validation engine 132 receives the sentiment score for a document section and performs cross validation and local interpretation of the neural network model 117. The outputs of the model training and validation engine 132 are performance metrics of the sentiment of the sentiment classification model. A model architecture and hyper-parameter tuning engine 134 receives the output of the model training and validation engine 132.

The hyper parameter tuning engine 134 processes those performance metrics and outputs model architecture and hyper-parameters that are provided back to the sentiment classification engine 117 to tune model 119.

Figure 2A:
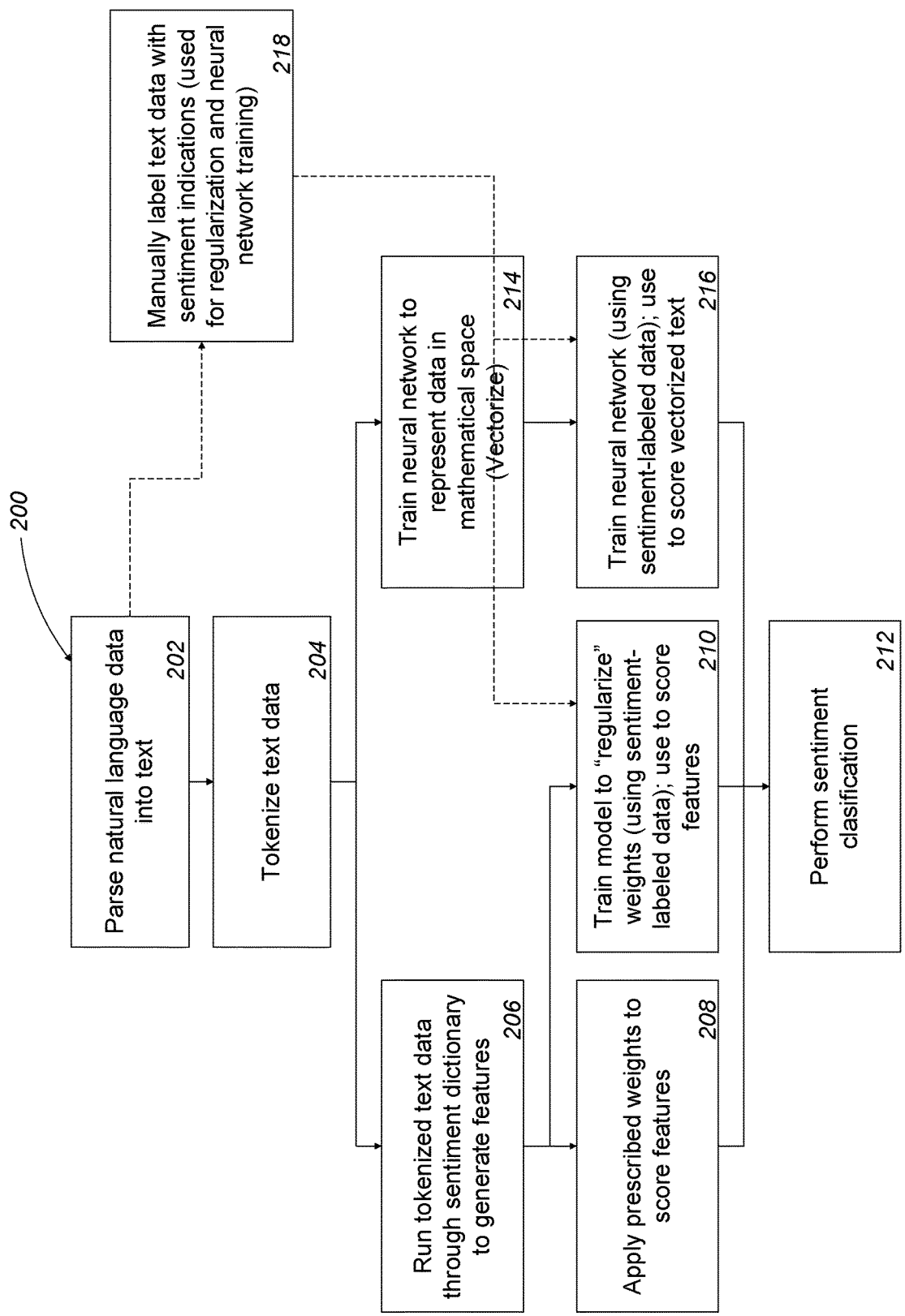
FIG. 2A is a flow chart showing various examples of approaches to sentiment analysis.

FIG. 2A is a flowchart of example approaches 200 for sentiment analysis. For convenience, the approaches 200 will be described as being performed by a system of one or more computers, located in one or more locations, and programmed appropriately in accordance with this specification. For example, a sentiment analysis system, e.g., the sentiment analysis system 100 of FIG. 1, appropriately programmed, can perform the approaches 200.

A first method starts with parsing 202 natural language data into text. The method then tokenizes 204 the text data to produce lexical tokens or simply tokens. In one embodiment, the method runs 206 the tokenized text data through a sentiment dictionary to generate features. The method can continue by applying 208 prescribed weights so as to score features. In addition the method can include training 210 a model to regularize weights (using sentiment labeled data). Finally, the method can perform 212 sentiment classification based on the scored features.

"Bag of Words" methodologies for natural language modeling rely on treating each feature in text data (including words, symbols, spaces, etc.) as a unique variable, calibrating a predictive weight for each feature (referred to, in combination, as a "dictionary"), and combining the dictionary weights for the features contained in a particular document (e.g., announcement) to predict an overall score for that document. The Bag of Words approach can be used both to develop prototype sentiment classification models, as well as to test the probability of a specified outcome (such as a probability of default) using documents, e.g., using Chinese small to medium enterprise (SME) announcements. There are a number of components of the Bag of Words analysis:

Data (Bag of Words-specific considerations);
Dictionary development; and
Model regularization.

Data (Bag of Words-Specific Considerations):

For sentiment classification model development, manually labeled announcements can be used to train and test the models.

For prediction analysis of the direct probability of a specific outcome, announcements for companies with total annual revenue above a specified value can be used to train the model, with a separate set of announcements reserved for testing. The annual revenue cutoff can be determined through preliminary analysis of the relevant dataset.

Dictionary Development

For prototype sentiment classification model development, a feature weights dictionary can be generated through regularization of the sentiment-labeled announcements, using a tokenized representation. Regularization is a technique to reduce or prevent overfitting For direct specified outcome prediction analysis, separate dictionaries can be developed for each relevant disclosure category. Within each category, the dictionary can be calibrated through regularization of the tokenized announcement text, using the predicted company-level specified outcome as the dependent variable.

Model Regularization

A combination of the following techniques can be used to perform dictionary regularization:

Categorical Proportional Difference (CPD): CPD is a measure of the degree to which a word contributes to differentiating a particular category from other categories. The CPD for a word in a particular category in a text corpus is a ratio that considers the number of documents of a category in which the word occurs and the number of documents from other categories in which the word also occurs.

Term Frequency (TF) refers to how frequently a term appears in a document: The combination of CPD and TF can be defined as a parametrized geometric average between the two as specified in the following equation:

$$TFCPD=(0.5+TF^{\wedge}0.5)*CPD$$

Feature reduction and calibration can utilize a random forest technique, testing the following approaches for sampling feature weights:

TFCPD
TF
None

In one embodiment and with reference to FIG. 1, the model training and validation engine can optimize the hyper-parameters of the sentiment classification model 117 for stable out-of-sample performance results across cross-validation iterations, with the following values:

3000 maximum number of Features,
500 Decision Trees,
A minimum of 10 observations in each Tree Leaf, to avoid overfitting and
TFCPD, as the set of Sampling Feature Weights TF and TFCPD can be used in two different ways. The measures carry prior information about each feature's likelihood of being relevant to the objective function. As such, they can be used to a) Select the Feature Set before the regularization process commences.
b) Assign weights to the features. These weights can be used during construction of decision trees in the random forest, where features are drawn randomly from the Feature Set. A feature more likely to have a relevance to the objective function, is assigned a higher weight, and hence gets selected more often, which in turn, can improve the overall performance of the random forest.

Returning to FIG. 2A, a second method uses the tokenized text data from step 204 to train 214 a neural network to represent data in a mathematical space, e.g., to vectorize the data. The method can train a neural network using sentiment labeled data and then use the trained neural network to score 216 the vectorized data. The scored vectorized data can be used to perform 212 sentiment classification. The first method and the second method can be performed alone or in combination.

In addition, the method can use natural language data (that is parsed 202 into text) to feed a system that manually labels 218 text data with sentiment indications. The manually labeled text data can then be used to train 210 the model that regularizes weights and uses the weights to score features.

Figure 2B:
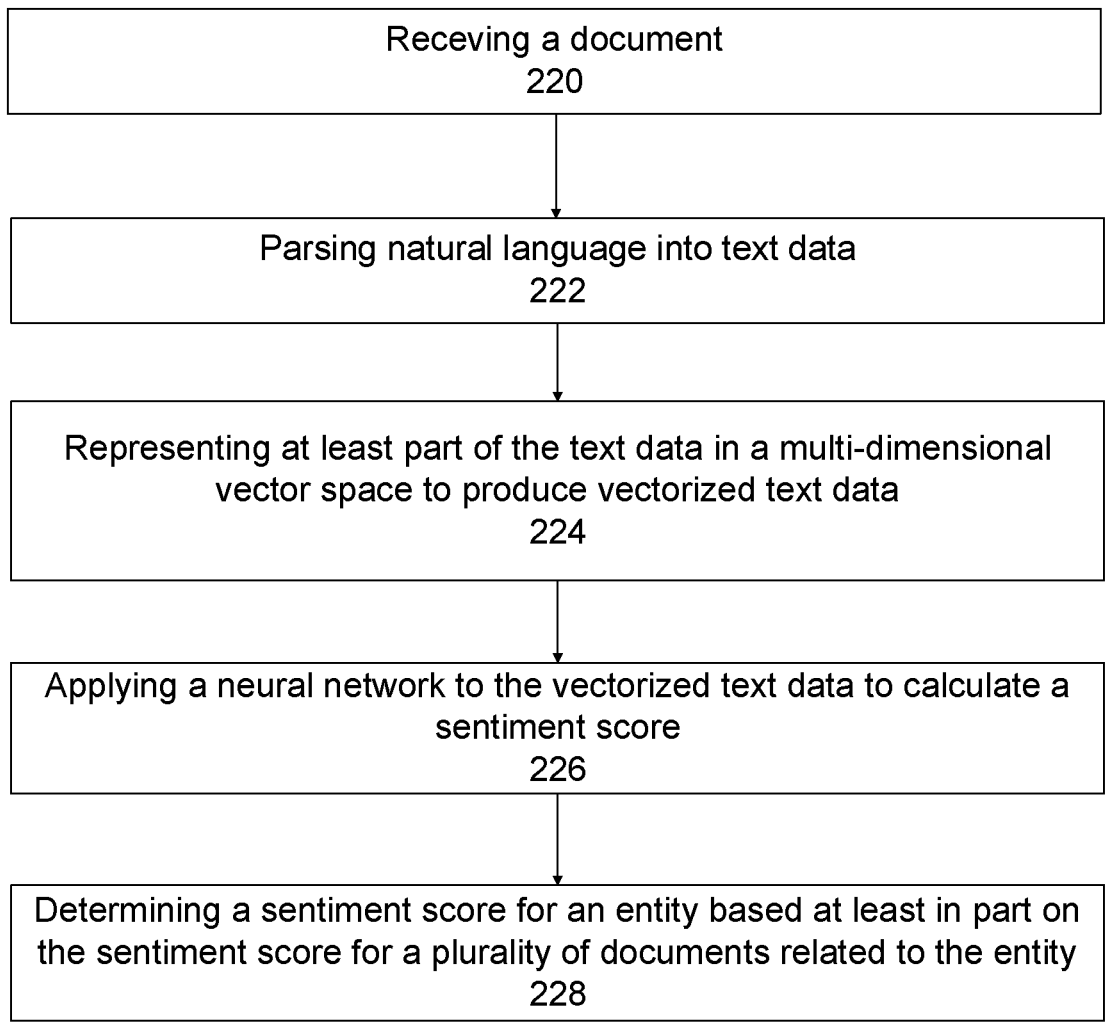
FIG. 2B is a flow chart showing another example of a sentiment analysis method.

With reference to FIG. 2B, a sentiment analysis method can include receiving 220 document, the document having text data and for each of the documents: representing 224 at least part of the document's text data in a multi-dimensional vector space to produce vectorized text data; applying 226 a neural network to the vectorized text data to calculate a sentiment score, and determining 228 a sentiment score for an entity based at least in part on the sentiment scores for the plurality of documents. The neural network can be trained using a two step process including: training the neural network with a non-domain specific training set; and training the neural network with a domain specific training set. If the document is received 220 without text data, e.g., as an image file, the method can include applying optical character recognition (OCR) to the image and then parsing 222 the natural language into parsed text data.

Figure 2C:
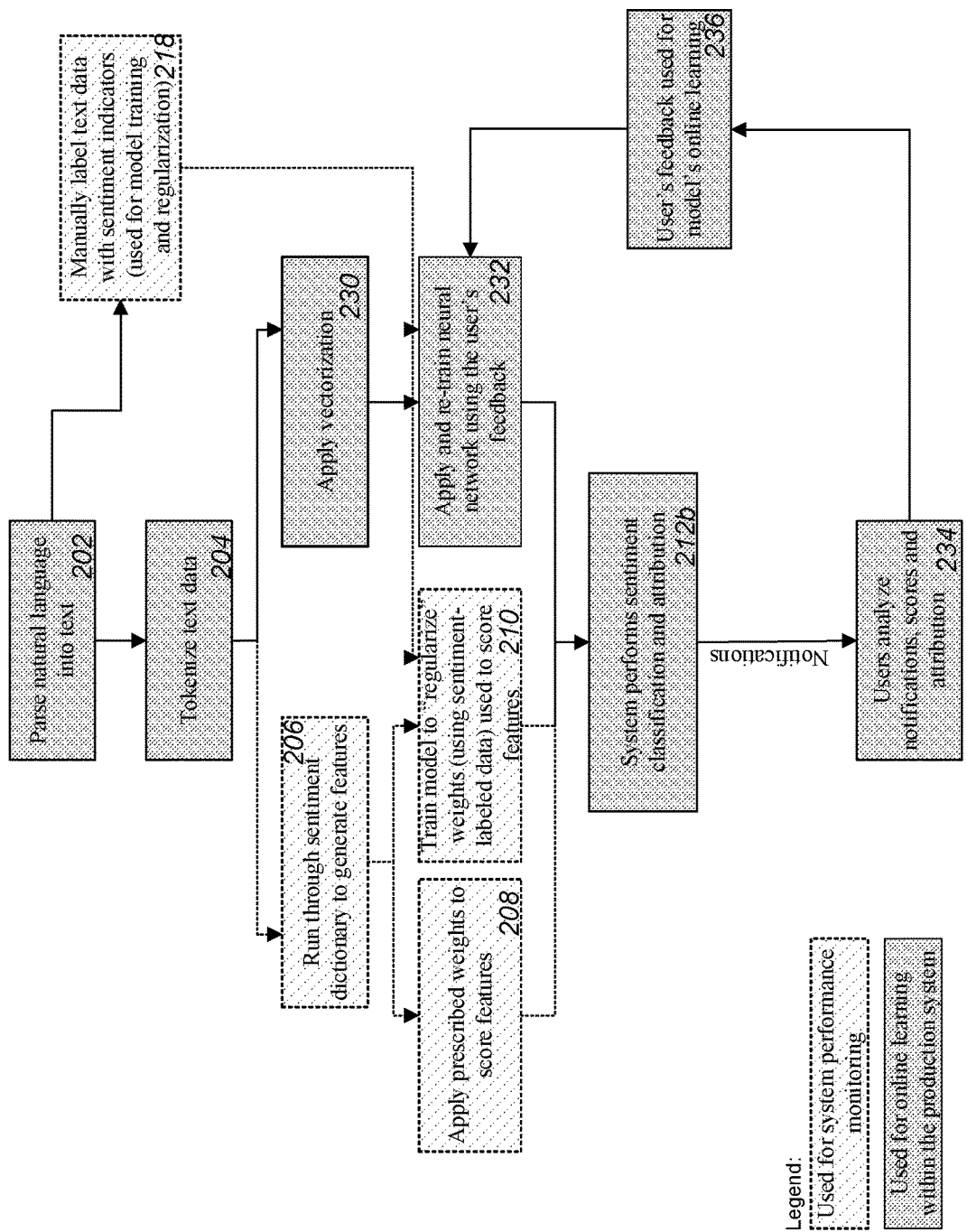
FIG. 2C is a flow chart showing another example of approaches to sentiment analysis.

FIG. 2C a flow chart showing another example of approaches to sentiment analysis. FIG. 2C illustrates much of the flow chart of FIG. 2A as a process for monitoring a production system and also in parallel illustrates a flow chart for a production system shown using grey-shaded boxes. The description of the monitoring system is substantially the same as the system described in FIG. 2A. The production system can include: parsing 202 natural language into text; tokenizing 204 text data; applying 230 vectorization; applying and re-training 232 a neural network using user feedback; performing 212b sentiment classification and attribution; sending notifications to users. A user can then analyze 234 notification, scores and attributions. The system can then receive 236 user feedback and re-train 232 the neural network model. The user feedback can take the form of feedback on the high-level sentiment (e.g., negative, neutral, positive or irrelevant) of one or more articles.

In parallel the monitoring system monitors the production system and if the monitoring system results deviate from the productions system results more than a specified amount the system administrator can be prompted to investigate, use a new training set for the production system, and/or use a new sentiment dictionary for the monitoring system.

Figure 3:
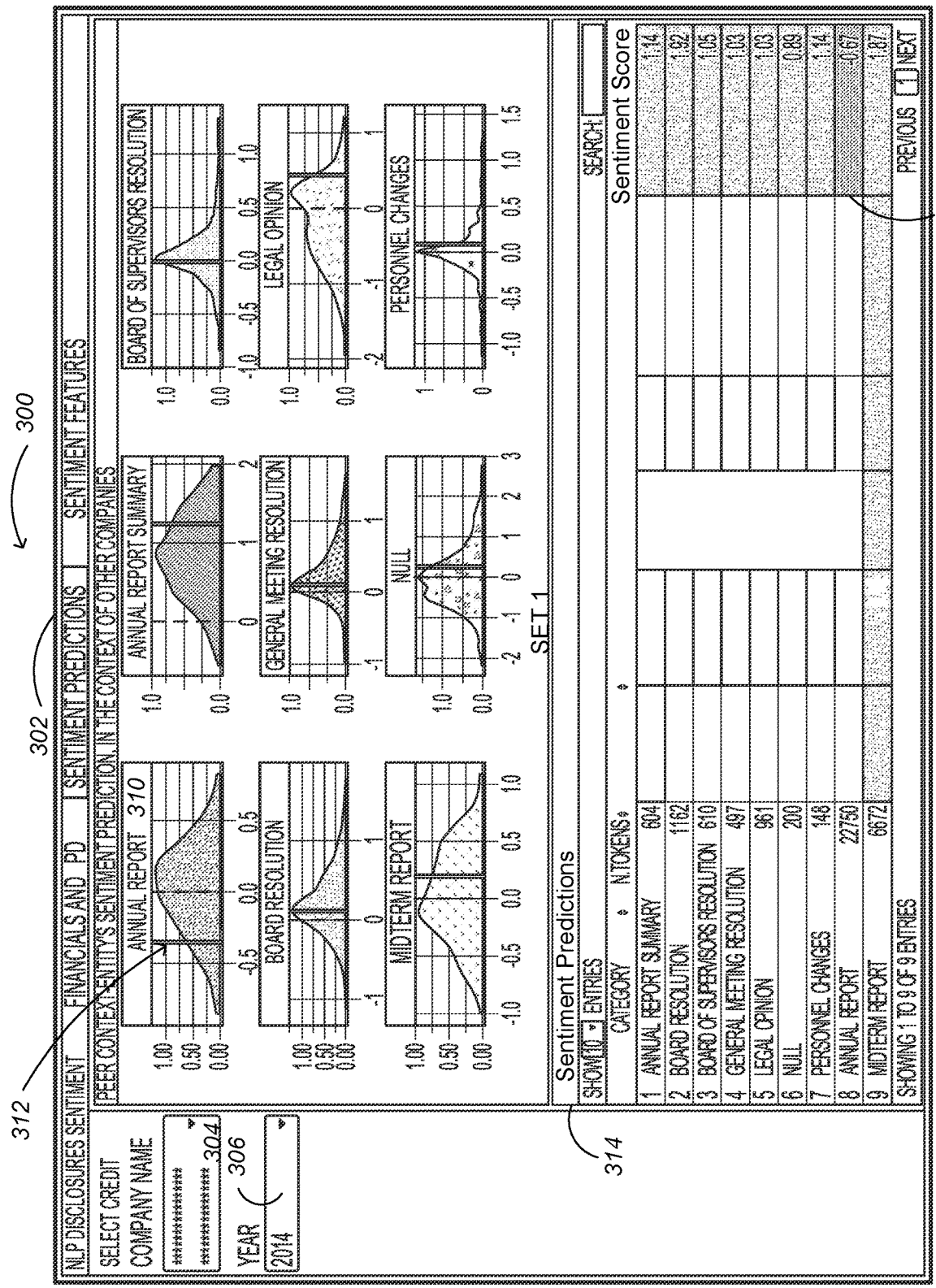
FIG. 3 is an example of a user interface for a sentiment analysis system.

A user interface can provide a user the results of a sentiment analysis system. For example, FIG. 3 is an example of a user interface for a sentiment analysis system such as system 100 of FIG. 1. The illustrated user interface 300 has a variety of selections at the top including sentiment predictions 302 and sentiment features. Sentiment predictions 302 is shown as selected. In this user interface, a user can enter a company's name 304 and a year of interest 306. When the company name and year are entered, the system can display peer-context, i.e., an entity's sentiment prediction in the context of other companies broken down into various documents categories such as annual reports 310, board resolutions, legal opinion and personnel changes.

As an example, the annual report category 310 shows the distribution of sentiment scores for other companies. The sentiment score is reflected on the x-axis. The y-axis is normalized and reflects the relative number of companies with the indicated sentiment score. The bold bar 312 in FIG. 3 is the predicted sentiment score of the company specified in field 304 in the year specified in field 306 and in the particular document category, e.g., the annual report category 310, shown in the context of the distribution of the sentiment scores of all companies in that year and category. Effectively the display 310 shows how sentiment of a category of documents from a company compares to those same types of documents from its peers.

The bottom of FIG. 3 also illustrates a user interface section 314 that shows sentiment predictions. Strong sentiment scores, e.g., strong negative sentiment scores, can be highlighted for the user. For example, in FIG. 3 a negative sentiment score 316 in the annual report category is highlighted in the column for the model trained by training set 5.

Figure 4:
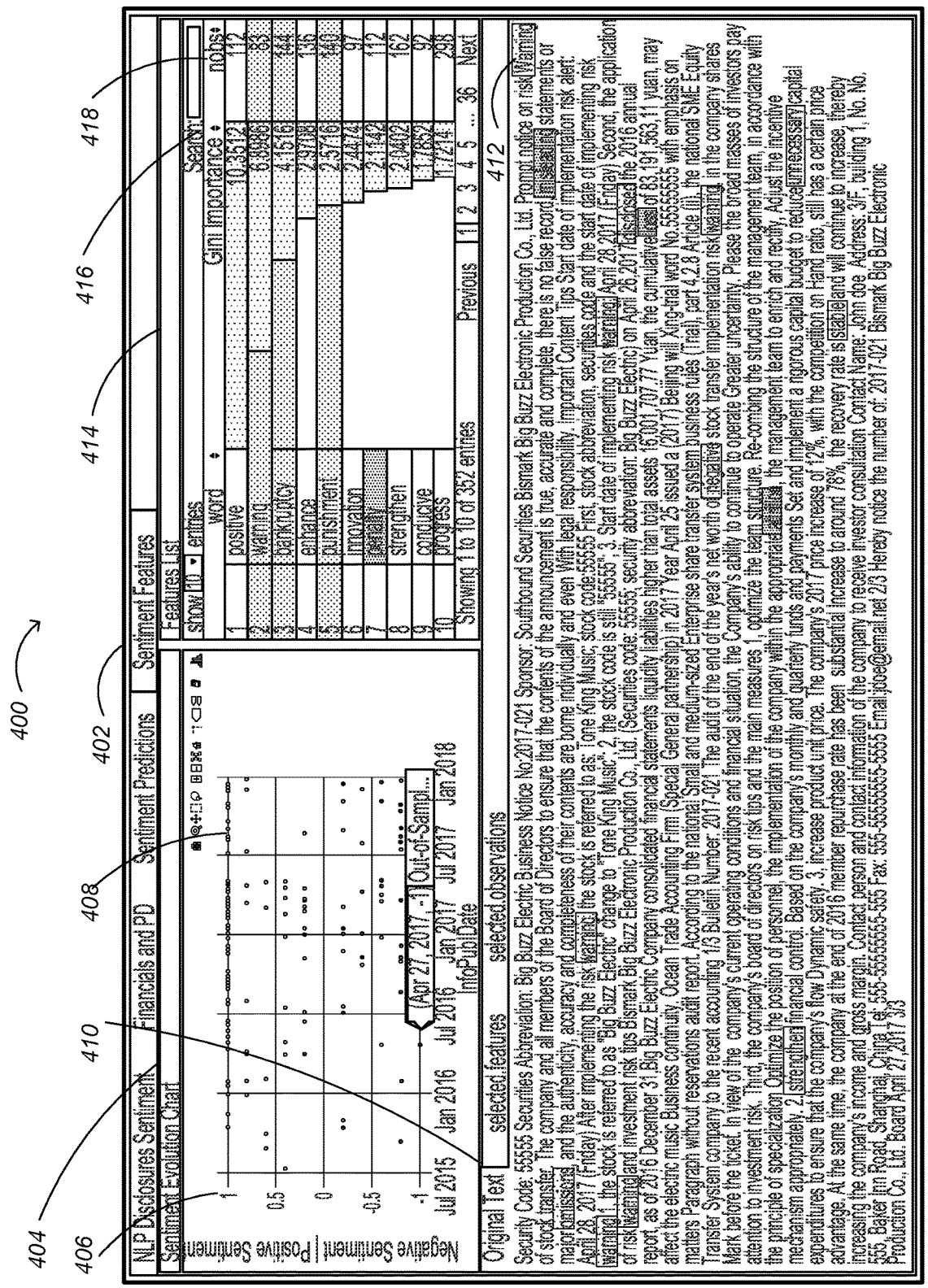
FIG. 4 is another example of a user interface for a sentiment analysis system.

FIG. 4 is another example of a user interface for a sentiment analysis system such as system 100 of FIG. 1. As in FIG. 3, the illustrated interface 400 of FIG. 4 has a variety of selections at the top including sentiment features 402 and sentiment predictions. The selection "sentiment features" 402 is shown as having being selected. In the top left of this sentiment features user interface 400 a sentiment evolution chart 404 is shown. The sentiment evolution chart includes a plot of documents related to an entity (the documents are represented by dots) where the y axis 406 represents the sentiment score on a scale of −1 to 1 and the x axis represents time (e.g., time in increments of months). When a user selects one of the dots representing a document, the user interface can display the text 410 of the document with specific words 412 highlighted. A word is highlighted when the word has made a contribution to the sentiment score above a specified threshold. Indeed, the color or intensity of the highlighting can indicate the degree to which the word contributed to the sentiment score.

The user interface 400 allows a user to interactively investigate documents, e.g., documents that are recent and contribute significantly to a sentiment score, to understand a particular document's sentiment more fully.

FIG. 4 also illustrates a features list 414. The features list can include a list of words (e.g., positive, warning, punishment), a score 416 that reflects the word's importance to a document's sentiment score and the number of observations 418 of the word in the document(s).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising;
   (a) receiving a plurality of documents related to an entity, each document having text data and for each of the documents:
      (1) representing at least part of the document's text data in a multi-dimensional vector space to produce vectorized text data;
      (2) applying a neural network to the vectorized text data to calculate a document sentiment score, the neural network trained using a process comprising:
         (A) training the neural network with a non-domain specific training set; and
         (B) training the neural network with a domain specific training set;
   (b) determining a sentiment score for an entity based at least in part on the document sentiment scores for the plurality of documents; and
   (c) forwarding document sentiment score data for display to a user, wherein the document sentiment score data comprises the document sentiment score and a document time stamp for each of the plurality of documents and wherein the document sentiment score data representing documents is configured to be displayed as points on a graph where one axis represents document sentiment scores and another axis represents time.

2. The method of claim 1 wherein the method further comprises ranking the plurality of documents based at least in part on each document's sentiment score.

3. The method of claim 1 wherein the method further comprises tokenizing the text data.

4. The method of claim 1 wherein the method further comprises receiving data indicating a selection by the user of a document and forwarding data configured to highlight via a display to the user at least one area in the selected document that reflects sentiment above a specified threshold.

5. The method of claim 1 wherein the plurality of documents relate to a specified company and wherein the method further comprises aggregating the sentiment of the plurality of documents to determine a sentiment score for the specified company.

6. The method of claim 1 wherein the multi-dimensional vector space has between 100 and 500 dimensions.

7. The method of claim 1 wherein representing at least part of the text data in a multi-dimensional vector space to produce vectorized text data comprises vectorizing words that appear more often than a specified threshold.

8. The method of claim 1, wherein the method further comprises:
   (a) receiving text data for a plurality of articles and for each of the articles:
      (1) parsing natural language into text data;
      (2) representing at least part of the text data in a multi-dimensional vector space to produce vectorized text data;
      (3) applying a neural network to the vectorized text data to calculate a sentiment score, wherein the neural network has been trained using a process comprising:
         (A) training the neural network with a non-domain specific training set; and
         (B) training the neural network with a domain specific training set; and
   (b) identifying at least one risk for a specified company based at least in part the sentiment scores for the plurality of articles.

9. The method of claim 7 wherein the risk is selected from a group of risks including vendor risk and supplier risk.

10. The method of claim 1 wherein the documents comprise natural language text and wherein receiving a plurality of documents further comprises parsing natural language into parsed text data and representing at least part of the document's parsed text data in a multi-dimensional vector space to produce vectorized text data.

11. A method comprising;
   (a) receiving a plurality of documents related to an entity and for each of the documents:
      (1) parsing natural language into text data;
      (2) representing at least part of the text data in a multi-dimensional vector space to produce vectorized text data;
      (3) applying a neural network to the vectorized text data to calculate a document sentiment score, the neural network trained using a process comprising:
         (A) training the neural network with a non-domain specific training set; and
         (B) training the neural network with a domain specific training set;
   (b) forwarding document sentiment score data for display to a user, wherein the document sentiment score data comprises the document sentiment score and a document time stamp for each of the plurality of documents and wherein the document sentiment score data representing documents is configured to be displayed as points on a graph where one axis document sentiment scores and another axis represents time; and
   (c) receiving data indicating a selection by the user of a document and forwarding data configured to indicate via a display to the user at least one area in the selected document that reflects sentiment above a specified threshold.

12. The method of claim 11, wherein the method further comprises displaying to a user a graph of at least some of the plurality of documents showing each article's date of publication and sentiment score.

13. A system comprising:
   one or more computers and one or more storage devices on which are stored instructions that are operable, when executed by the one or more computers, to cause the one or more computers to perform operations comprising:
   (a) receiving a plurality of documents related to an entity, each document having text data and for each of the documents:
      (1) representing at least part of the document's text data in a multi-dimensional vector space to produce vectorized text data;
      (2) applying a neural network to the vectorized text data to calculate a document sentiment score, the neural network trained using a process comprising:
         (A) training the neural network with a non-domain specific training set; and
         (B) training the neural network with a domain specific training set;
   (b) determining a sentiment score for an entity based at least in part on the document sentiment scores for the plurality of documents; and
   (c) forwarding document sentiment score data for display to a user, wherein the document sentiment score data comprises the document sentiment score and a document time stamp for each of the plurality of documents and wherein the document sentiment score data representing documents is configured to be displayed as points on a graph where one axis represents document sentiment scores and another axis represents time.

14. The system of claim 13 wherein the operations further include ranking the plurality of documents based at least in part on each document's sentiment score.

15. The system of claim 13 wherein the operations further comprise tokenizing the text data.

16. The system of claim 13 wherein the operations further comprises receiving data indicating a selection by a user of a document and forwarding data configured to highlight via a display to the user at least one area in the selected document that reflects sentiment above a specified threshold.

17. The system of claim 13 wherein the plurality of documents relate to a specified company and wherein the operations further comprise aggregating the sentiment of the plurality of documents to determine a sentiment score for the specified company.

18. The system of claim 13 wherein the multi-dimensional vector space has between 100 and 500 dimensions.

19. The system of claim 13 wherein representing at least part of the text data in a multi-dimensional vector space to produce vectorized text data comprises vectorizing words that appear more often than a specified threshold.

20. The system of claim 13 wherein the operations further comprise:
 (a) receiving text data for a plurality of articles and for each of the articles:
  (1) parsing natural language into text data;
  (2) representing at least part of the text data in a multi-dimensional vector space to produce vectorized text data;
  (3) applying a neural network to the vectorized text data to calculate a sentiment score, wherein the neural network has been trained using a 2 step process comprising:
   (A) training the neural network with a non-domain specific training set; and
   (B) training the neural network with a domain specific training set; and
 (b) identifying at least one risk for a specified company based at least in part the sentiment scores for the plurality of articles.

* * * * *